United States Patent [19]

Kreth et al.

[11] Patent Number: 4,665,939

[45] Date of Patent: May 19, 1987

[54] PRIORITY CONTROL FOR HYDRAULIC CONSUMERS

[75] Inventors: Norbert Kreth; Peter Buttner, both of Lohr; Norbert Mucheyer, Rechtenbach, all of Fed. Rep. of Germany

[73] Assignee: Mannesmann Rexroth GmbH, Lohr/Main, Fed. Rep. of Germany

[21] Appl. No.: 831,344

[22] Filed: Feb. 20, 1986

[30] Foreign Application Priority Data

Feb. 28, 1985 [DE] Fed. Rep. of Germany ....... 3507122

[51] Int. Cl.⁴ ............................................. G05D 11/03
[52] U.S. Cl. .................................................... 137/101
[58] Field of Search .......................... 60/422; 137/101

[56] References Cited

U.S. PATENT DOCUMENTS 3,642,019 2/1972 Kramer ................................. 137/101
4,070,857 1/1978 Wible ...................................... 60/422
4,087,968 5/1978 Bianchetta .

FOREIGN PATENT DOCUMENTS 2656059 7/1977 Fed. Rep. of Germany .
3320047 12/1984 Fed. Rep. of Germany .
3422164 12/1984 Fed. Rep. of Germany .

*Primary Examiner*—Robert G. Nilson
*Attorney, Agent, or Firm*—Harness, Dickey & Pierce

[57] ABSTRACT

In a priority control device the supply flow to the lower-ranking consumer is set by a flow control valve (pressure balance) whose control chamber subjected to the control pressure of the lower-ranking consumer can be relieved of pressure via a proportional valve. The proportional valve is adjusted in dependence upon the load pressure of the priority consumer so that the flow of fluid to the lower-ranking consumer is throttled by the pressure balance when the pressure difference at the priority consumer drops on increased volume flow requirement. The priority control device thus consists of two simply constructed power valves and a small-dimensioned pilot valve.

7 Claims, 1 Drawing Figure

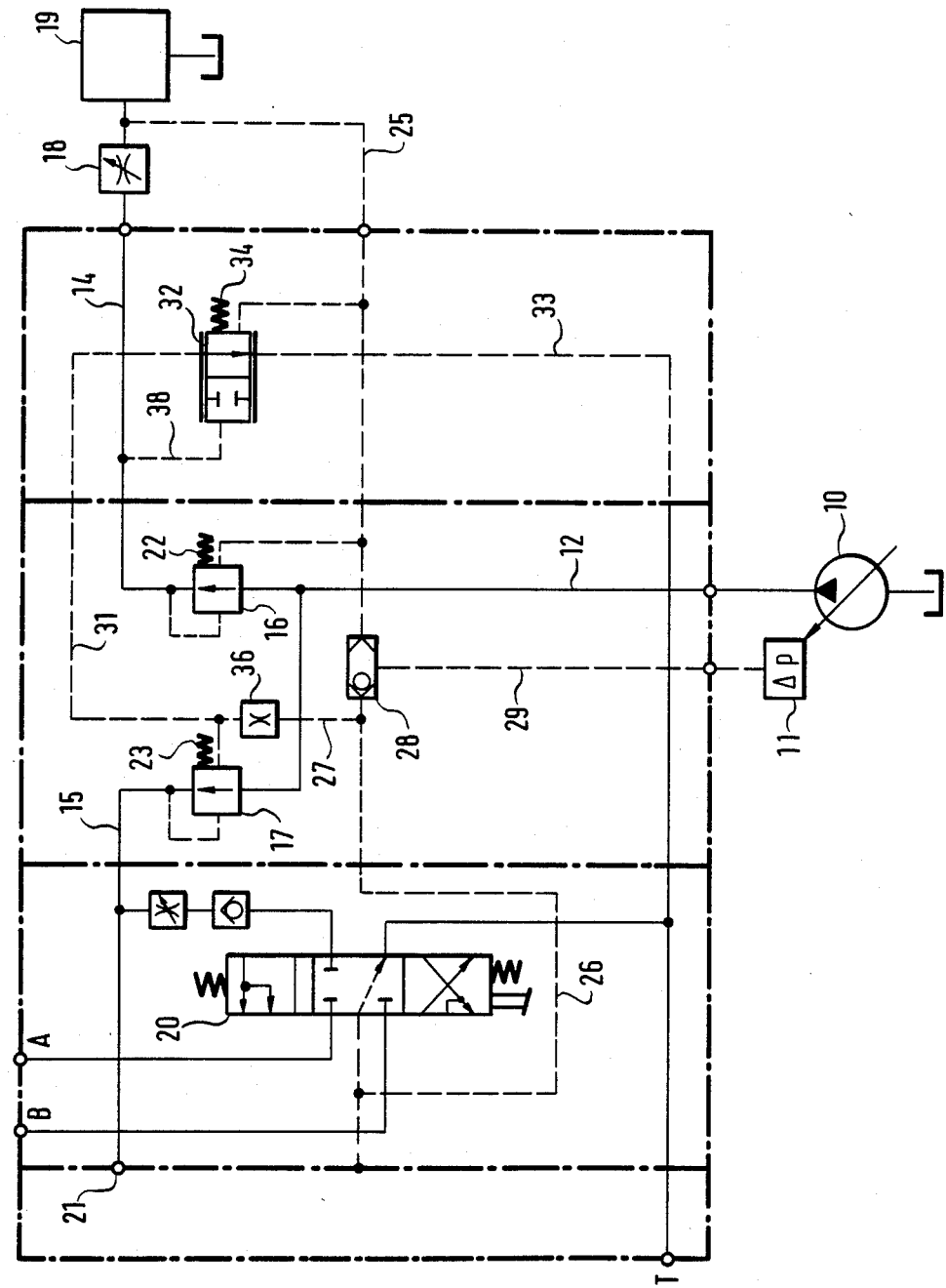

PRIORITY CONTROL FOR HYDRAULIC CONSUMERS

BACKGROUND OF THE INVENTION

The invention relates to a priority control device for at least two consumers having the features set forth in the preamble of claim 1.

It is known to divide the pressure medium or fluid amongst a priority consumer and a lower-ranking consumer in such a manner that both consumers are connected via a priority valve to the fluid line. The control piston of the priority control valve is subjected to the load pressure of the priority consumer and in the opposite direction to the pump pressure so that on actuating the control valve for the priority consumer the priority valve is moved so that the supply flow of fluid to the lower-ranking consumers is throttled and to the priority consumer is increased. The control piston of such priority valves is provided with three control edges.

It is also known (U.S. Pat. No. 2,892,311) to provide the priority control valve in the working line leading to the lower-ranking consumer. The control piston of this valve is subjected on the one hand to the working pressure tapped off at the priority load as control pressure and in the opposite sense to a pressure which is adjustable at an additional valve whose valve body is also subjected to the control pressure at the priority consumer. If on actuation of the priority consumer or load the control pressure rises the priority control valve is displaced and the flow of fluid to the lower-ranking consumer is throttled or shut off.

In particular in vehicles with hydraulic steering the steering must have priority in the supply with fluid, the supply of fluid to other hydraulic loads or consumers having to be throttled or shut off as soon as the steering valve is actuated.

The problem underlying the invention resides in constructing a priority control device, in particular for a hydraulic steering mechanism, in the simplest possible manner and so that it operates reliably.

SUMMARY OF THE INVENTION

This problem is solved by the features set forth in the characterizing clause of claim 1.

The supply of the lower-ranking consumers is via a flow control valve or pressure balance in which the control piston chamber connected to the control pressure line for the lower-ranking consumers is adapted to be connected to the tank via the proportional valve. The control piston of the proportional valve opens the connection to the tank increasingly when on actuation of the control valve for the priority consumer the pressure difference between the pump and load drops below a predetermined value so that by the control pressure relief of the pressure balance the latter is shifted in the closure direction and thus throttles the flow to the lower-ranking consumer. The priority control device is thus made up of simple valves which can be made in series production, i.e. a flow control valve which can be simply made in particular also for large flow rates, and a 2/2 proportional valve.

BRIEF DESCRIPTION OF THE DRAWING

An example of embodiment of the invention will be explained hereinafter with the aid of the single FIGURE of drawing which shows a schematic representation of a priority control device for a hydraulic steering.

DETAILED DESCRIPTION OF THE PREFERRED EMBODIMENT

An adjustable output pump 10 whose adjusting means is denoted by 11 is connected via a line 12 to a working line 14 and a working line 15 in each of which a respective pressure balance valve 16 and 17 is provided. The working line 14 leads to a control valve 18 of a priority consumer 19. The latter is preferably a hydraulic steering system.

The working line 15 leads to a control valve 20 for a lower-ranking consumer which is not illustrated and via a connection 21 to further consumers also not illustrated. The control valve 20 is connected in known manner via the connections A and B for example to a hydraulic servomotor which comprises the lower ranking consumer.

The pressure balance valves 16 and 17 serve for load pressure compensation. The control pistons of the pressure balance valves 16 and 17 are each subjected directly to the respective pressure in the working line 14 or 15 (as shown by the broken control line) and in the opposite sense to a control pressure which acts on the control piston in addition to the force of a respective spring 22 or 23. The load pressure of the priority consumer 19 is tapped off downstream of the control valve 18, which is shown as throttle valve, and led via a control pressure line 25 to the pressure balance valve 16. On the other hand the working pressure for the lower-ranking consumer is tapped off downstream of the control valve 20 and led via a control line 26 and a branch 27 to the pressure balance valve 17. Both control pressure lines 25 and 26 are connected to a shuttle valve 28 so that the particular higher control pressure is conducted via a line 29 to the adjusting means 11 of the adjusting pump 10 to increase the volume flow of the pump when the control pressure increases.

Furthermore, the spring chamber of the pressure balance valve 17 subjected to the control pressure of the lower-ranking consumer is connected via a line 31 and via a proportional valve 32 to a line 33 leading to the tank T. The control piston of the proportional valve 32 is acted upon in one direction by the pressure in the working line 14. The control piston of the proportional valve 32 is acted upon in the opposite sense by the force of a spring 34 and by the control pressure in the control pressure line 25. Thus, at the control piston of the proportional valve 32 the pressure difference arising at the control valve 18 for the priority consumer acts.

As long as the control valve 18 for the hydraulic steering receives via the working line 14 a volume flow adequate for the steering actuation the pressure difference at the control valve 18 has a predetermined value which is set by means of the spring 34 of the proportional valve 32 so that the valve is switched by the pressure in the working line 14 oppositely to the illustrated position and thus blocks the discharge of the line 31 to the tank. The pressure difference can for example be 8 bar.

The flow or fluid to the consumers is regulated by the pressure balance valves 16 and 17 in accordance with the control pressure of the priority consumer and lower-ranking consumer in the control pressure lines 25 and 26 respectively.

If however the priority consumer receives too little fluid because too much fluid has been taken off for a lower-ranking consumer, the pressure difference at the control piston of the proportional valve 32 drops below the predetermined value of for example 7 bar and the proportional valve is thereby moved in the opening direction. In the drawing it is shown in the fully open position but the adjustment and thus the discharge to the tank line 33 takes place in proportion to the particular pressure difference at the control piston. The control piston of the pressure balance 17 is thus relieved of pressure and the pressure balance 17 closes and throttles the flow of fluid to the control valve 20 and connection 21. Thus, the flow to the lower-ranking consumers is throttled in accordance with the pressure difference at the steering valve 18 and thus at the proportional valve 32.

To enable the control chamber of the pressure balance valve 17 on the spring side to be relieved of pressure a throttle 36 is provided in the branch 27 to the control pressure line 26.

If the volume flow requirement for the hydraulic steering diminishes the pressure difference again increases at the proportional valve and the latter is moved in the closure direction so that the control pressure for the pressure balance valve 17 is increased and the latter again adjusted in the opening direction.

The control piston of the proportional valve 32 can also be subjected to the pressure in the pressure line 12 via an appropriate control line. This is advantageous when the proportional valve 32 is mounted directly on the pump 10 because then the control line 38 leading from the working line 14 to the consumer is not necessary and said line can be dispensed with.

We claim:

1. A priority control device for at least two consumers of different ranking, a pressure source of working fluid, and means for delivering fluid from said pressure source to each of said consumers including means for reducing the flow of fluid from said pressure source to the lower priority consumer in response to increased demands of the higher priority consumer comprising a lower priority consumer control valve interposed between said pressure source and said lower priority consumer for controlling the fluid delivered from said pressure source to said lower priority consumer, means for applying pressure from the side of said lower priority consumer control valve leading to said lower priority consumer to said lower priority consumer control valve in a direction for closing said lower priority consumer control valve, a control pressure line acting on said lower priority consumer control valve in a direction for opening said lower priority consumer control valve, a proportional valve for controlling the communication of said control pressure line with a tank for selectively reducing the pressure in said said control pressure line, means for transmitting the pressure delivered to said higher priority consumer to said proportional valve for urging said proportional valve in a direction to open the communication of said control pressure line with said tank for reducing the control pressure exerted on said lower priority consumer control valve when a high pressure is delivered to said higher priority consumer, and means for delivering fluid pressure from said fluid pressure source to said proportional valve in a direction for urging said proportional valve to close the communication of said control pressure line with said tank for increasing the pressure in said control pressure line, said proportional valve thereby being effective for response to the pressure difference between said pressure source and the pressure applied to said higher priority consumer for restricting the pressure supplied to said lower priority consumer through said lower priority consumer control valve when the pressure difference between the supply pressure and the pressure supplied to said higher priority control valve exceeds a predetermined amount.

2. Priority control device according to claim 1, characterized in that the pressure difference at the proportional valve is set by a spring acting in the same sense as the pressure delivered to said higher priority consumer.

3. Priority control device according to claim 1, characterized in that the proportional valve is a two position, two way valve.

4. Priority control device according to claim 1, characterized in that a throttle is positioned in the control pressure line upstream of the proportional valve.

5. Priority control device according to claim 1, characterized in that a high priority control valve is interposed between the fluid pressure source and the higher priority consumer, said high priority control valve being responsive to the pressure difference between the supply pressure and the pressure in the working line leading to the higher priority consumer.

6. Priority control device according to claim 1, characterized in that the higher priority consumer (19) is a hydraulic steering system.

7. Priority control device according to claim 1, characterized in that the proportional valve is subjected pressure supply to the pressure.

* * * * *